Patented Sept. 16, 1924.

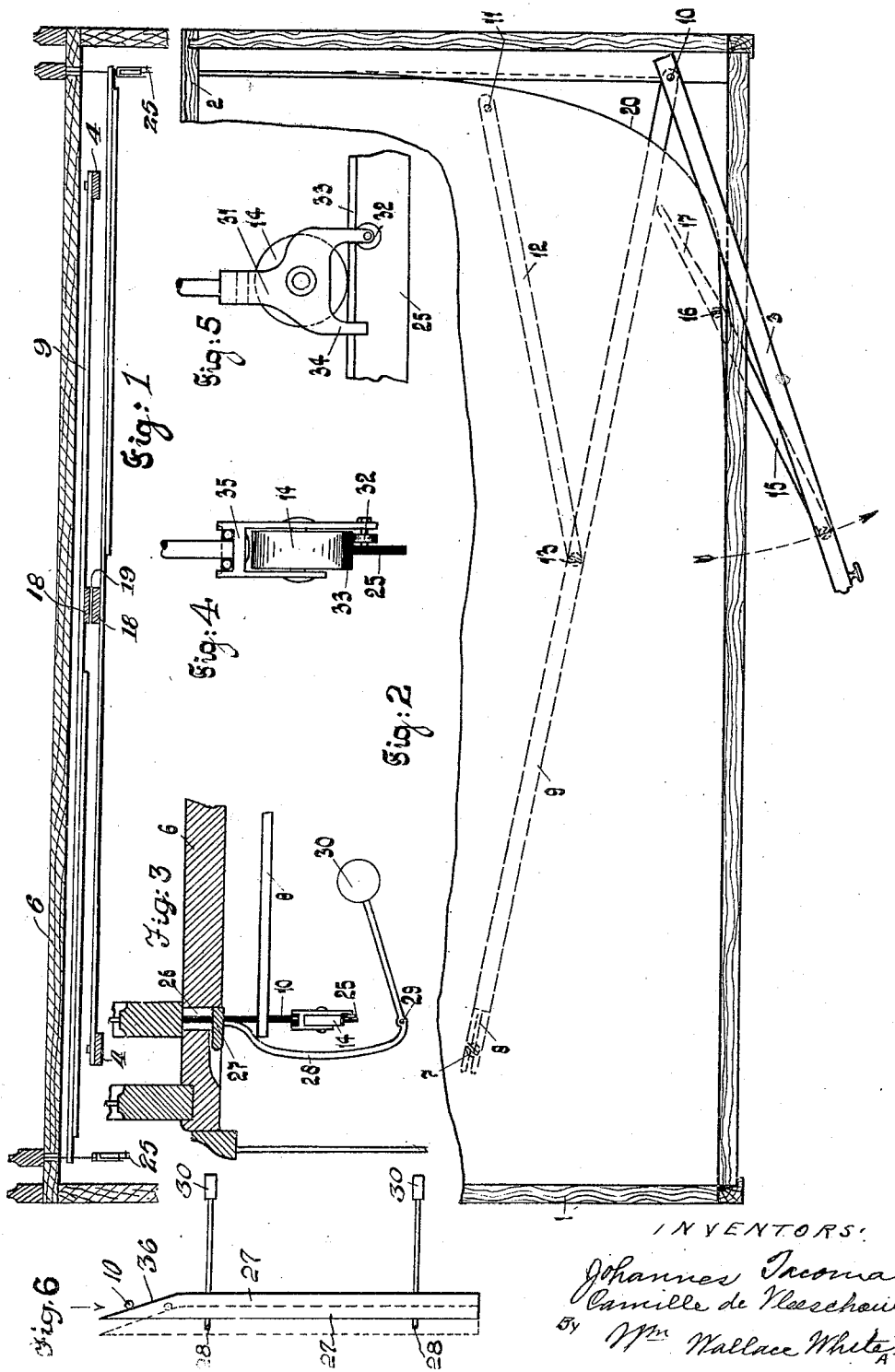

1,508,583

UNITED STATES PATENT OFFICE.

JOHANNES TACOMA AND CAMILLE DE VLEESCHOUWER, OF AMSTERDAM, NETHERLANDS.

DUST-PREVENTING DEVICE.

Application filed August 4, 1921. Serial No. 489,659.

*To all whom it may concern:*

Be it known that we, JOHANNES TACOMA and CAMILLE DE VLEESCHOUWER, subjects of the Queen of the Netherlands, residing at Amsterdam, in the Province of North-Holland, Kingdom of the Netherlands, have invented certain new and useful Improvements in Dust-Preventing Devices, of which the following is a specification.

The invention relates to a dust preventing device for use in connection with mechanism for moving doors and the like and more especially the doors of show cases in shops, stores, workrooms and is an improvement in or modification of the mechanism described and claimed in our prior Patent Nr. 1,286,143, granted November 26, 1918.

The mechanism according to the present invention prevents dust from entering the slots through which the supporting bolts for the sides of the doors pass through the bottom of the floor of the show case or the like, and consists of a bar having a bevelled edge connected to a lever pivoted on a horizontal axis, and a counter weight disposed on said lever for maintaining said bevelled bar over the slot.

The invention will now be described with reference to the annexed drawings which represent by way of example a case having a pair of doors.

Figure 1 is a longitudinal sectional view of a device embodying the present invention, the bottom being shown.

Figure 2 is a partial plan view of the casing showing one of the doors partly opened.

Figure 3 is a cross-section as shown at the left hand of Figure 2 but on a larger scale, showing in cross-section the dust-tight fitting of the parts.

Figure 4 is a section through one of the wheels carrying the door on a larger scale and Figure 5 is a side-view of Figure 4.

Fig. 6 is a plan view of the parts shown in Fig. 3.

In Figure 2 the side walls of the case are indicated by 1 and the back wall thereof by 2. The doors 3, 3 are in the closed position.

Beneath the bottom of the floor of the case a pair of transverse bars 4, 4 respectively is provided. In the middle or near the middle of each of the transverse bars 4, which are located a short distance from the side walls 1, 1 a pin 7 is provided which is engaged by the forked end 8 of a rod or bar 9, in such a manner that the rod or bar 9 may turn about and slide lenthwise for a certain distance on said pin. At its other end each of the rods or bars 9 has a vertically disposed bolt 10 attached to it, which bolts 10, 10 support the sides of the doors 3, 3 and carry under the floor 6 of the casing a wheel 14, the latter resting on the T rail 25. Said bolts pass through a slot 26 in the floor.

The side flange 31 carrying the pivot of the wheel 14 extends beyond the horizontal flange 33 of the T-rail 25 and carries a wheel 32 which runs under the flange 33 of the rail. Said flange 31 is provided with an arm 34, resting against the edge of the flange 33 of the rail. The arm 34 prevents the roller 14 from leaving the rail. The wheel 32 prevents the door from tilting when it is drawn out of the show case.

The wheel 14 is pivotally mounted on the bolt 10 by means of a ball bearing 35.

Radius rods 12, 12 are carried on pivots 11, which are mounted on lugs 5, 5 on the side walls of the case, the free ends of said radius rods being connected to the rods or bars 9, 9 in such a manner that the rod 9 connected to the right-hand door is coupled to the radius rod 12, having its pivot at the right-hand side of the case and vice-versa. The length of the rods 12, the position of their pivots 11 and of the connections 13 enable the bolts 10 to move along practically straight lines *a*, *a* when the pivots 13 describe arcs about the pivots 11.

At those sides of the doors which join when the case is closed, there are provided flat bars 15, 15 at both the upper and lower edges of the doors and having their pivots at 16, 16 mounted on the casing. These flat bars 15, 15 extend across said pivots and form fingers 17, 17 which in the closed position of the doors 3, 3, engage the rods 9, 9.

The coupling of the moving mechanism of both doors is effected by interlinking the lateral arms 18, 18 which extend in opposite directions, relatively of the rods 9, 9 at the centre of the width of the case, by means of a coupling link 19.

The coupling means forces the mechanism of both of the doors to move symmetrically and uniformly.

The curve 20, tangent to the successive positions of the doors when opened, is indicated in Figure 2 for the right hand door. In the bottom of the case illustrated there is formed a recessed portion or grooving limited by said curve 20. It should be noted that the door moves without any friction along the edge of said recessed portion as it is supported on the bolt 10 and its movement is determined by the rod or bar 15.

The dust tight fitting shown in cross-section in Figure 3 and in plan view in Fig. 6 comprises a bar 27 connected to a curved lever 28 pivoted about a horizontal axis 29 and carrying a counterweight 30.

The bar 27 is kept against the side wall of the slot 26 by the action of the counterweight. When the doors are moved from the closed or opened position the bolts 10 strike bevelled edges 36 of the bars 27 and thereby press the bars forward so that the bolts 10 can move through the slots 26, sliding along the rear ends of the bars 27.

The operation of the dust preventing device is as follows;

The slot 26 is closed by the bar 27 as shown in Fig. 3. When opening the door, the rod 10 pushes the bar 27 aside by means of the beveled edge 36, the slot 26 thereby being partly open and remaining open as long as the doors are open. As soon as the doors are closed, the rod 10 assumes again the position shown in full line in Fig. 6, whereby the bar 27 closes the slot 26 and is held in this position by means of the counterweight 30.

The invention is not restricted to the doors of cases and the like, but may be applied in general to all purposes where a slot is to be closed to exclude dust, and through which slot a supporting or other bar passes.

What we claim is:

A dust preventing device for use in connection with mechanism for doors of show cases and the like having a slot therein for the reception of a part of said mechanism, comprising a lever pivoted on a horizontal axis, a bar having a bevelled edge connected to said lever, and a counterweight disposed on said lever for maintaining said bevelled bar over said slot.

In testimony whereof, we affix our signatures.

JOHANNES TACOMA.
CAMILLE DE VLEESCHOUWER.